(12) United States Patent
Takemoto

(10) Patent No.: US 6,716,279 B2
(45) Date of Patent: Apr. 6, 2004

(54) INK COMPOSITIONS WITH EXCELLENT LIGHT RESISTANCE

(75) Inventor: Kiyohiko Takemoto, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 250 days.

(21) Appl. No.: 10/030,602

(22) PCT Filed: May 10, 2001

(86) PCT No.: PCT/JP01/03902
§ 371 (c)(1),
(2), (4) Date: Jan. 9, 2002

(87) PCT Pub. No.: WO01/85856
PCT Pub. Date: Nov. 15, 2001

(65) Prior Publication Data
US 2003/0000419 A1 Jan. 2, 2003

(30) Foreign Application Priority Data
May 10, 2000 (JP) .................................... 2000-137484

(51) Int. Cl.$^7$ .......................... C09D 11/00; C09D 11/02; B41J 2/01
(52) U.S. Cl. .................... 106/31.6; 106/31.28; 347/100
(58) Field of Search ............................ 106/31.6, 31.28; 347/100

(56) References Cited

U.S. PATENT DOCUMENTS

| 5,108,504 A | | 4/1992 | Johnson et al. ........... 106/31.36 |
| 5,476,541 A | | 12/1995 | Tochihara ................ 106/31.52 |
| 6,027,210 A | * | 2/2000 | Kurabayashi et al. ....... 347/100 |
| 6,610,133 B2 | * | 8/2003 | Campbell ................. 106/31.86 |
| 2003/0035034 A1 | * | 2/2003 | Fukumoto et al. ............ 347/86 |
| 2003/0179263 A1 | * | 9/2003 | Sekiya ........................ 347/47 |

FOREIGN PATENT DOCUMENTS

| JP | 60104168 | 6/1985 |
| JP | 09059548 | 3/1997 |
| JP | 10183042 | 7/1998 |
| JP | 44856 | 2/2000 |
| JP | 49156 | 2/2001 |

OTHER PUBLICATIONS

Patent Abstract of Japan Publication No. 09059548 dated Mar. 4, 1997.
Patent Abstract of Japan Publication No.200044856 dated Feb. 15, 2000.
Patent Abstract of Japan Publication No.10183042 dated Jul. 7, 1998.
Patent Abstract of Japan Publication No.60104168 Jun. 8, 1985.
Patent Abstract of Japan Publication No.2001049156 dated Feb. 20, 2001.

* cited by examiner

Primary Examiner—Helene Klemanski
(74) Attorney, Agent, or Firm—Ladas & Parry

(57) ABSTRACT

An object of the present invention is to provide ink compositions possessing excellent lightfastness. The cyan ink composition according to the present invention comprises, as colorants, a cyan colorant selected from the group consisting of C.I. Pigment Blue 15:3, C.I. Pigment Blue 15:4, and a mixture of the cyan colorants, and a yellow colorant having a higher fading rate than the cyan colorant. The magenta ink composition according to the present invention comprises, as colorants, a magenta colorant selected from the group consisting of C.I. Pigment Red 122, C.I. Pigment Red 202, C.I. Pigment Red 209, and mixtures of the magenta colorants, and a yellow colorant having a higher fading rate than the magenta colorant.

20 Claims, No Drawings

INK COMPOSITIONS WITH EXCELLENT LIGHT RESISTANCE

BACKGROUND OF THE INVENTION

1. Field of the Invention

The present invention relates to a cyan ink composition and a magenta ink composition each possessing excellent lightfastness.

2. Background Art

Ink jet recording printers are becoming widely spread in recent years. Ink jet recording is a printing method wherein droplets of an ink composition are ejected and deposited on recording media, such as paper, to perform printing. The feature of the ink jet recording is that images having a combination of high resolution with high quality can be printed at a high speed by means of a relatively inexpensive apparatus. In particular, color ink jet recording apparatuses can improve image quality, can also be utilized as an output device for photographs, and have also become used, for example, as digital printing machines, plotters, and CAD output devices. The images printed by ink jet recording printers, which have become widely utilized in this way, are considered utilizable in various forms. In particular, for example, photograph-like prints are considered to be placed for display in a place exposed to light emitted from a fluorescent lamp or direct sunlight, for example, in the open for a long period of time. Therefore, lightfastness is a very important property requirement to be satisfied by records produced by ink jet recording.

In recent years, inks using a pigment as a colorant have become used for improving the lightfastness of records produced by ink jet recording. In the case of color images yielded by pigment-based ink compositions, fading of images can be suppressed even when exposed to light emitted from a fluorescent lamp or direct sunlight, for example, in the open for a long period of time. Even in such a case, however, in some cases, the hue of the image undergoes a change, and, consequently, the whole image becomes yellowish. For this reason, an ink composition has been desired that can yield images which are less likely to be deteriorated even after storage for a long period of time, that is, possesses excellent lightfastness.

SUMMARY OF THE INVENTION

The present inventors have now found that, in a cyan ink composition, a yellow colorant having a specific fading rate added in addition to a general cyan colorant can suppress a change in hue of printed ink and, consequently, can improve lightfastness of the yielded images. The present inventors have also found that the improvement in lightfastness of images can also be achieved in the same manner in the case of a magenta ink composition. The present invention has been made based on such finding.

Accordingly, it is an object of the present invention to provide an ink composition which can realize images possessing excellent lightfastness.

Thus, according to one aspect of the present invention, there is provided a cyan ink composition comprising, as colorants, a cyan colorant selected from the group consisting of C.I. Pigment Blue 15:3, C.I. Pigment Blue 15:4, and a mixture of said cyan colorants, and a yellow colorant having a higher fading rate than the cyan colorant.

According to another aspect of the present invention, there is provided a magenta ink composition comprising, as colorants, a magenta colorant selected from the group consisting of C.I. Pigment Red 122, C.I. Pigment Red 202, C.I. Pigment Red 209, and mixtures of said magenta colorants, and a yellow colorant having a higher fading rate than the magenta colorant.

According to a further aspect of the present invention, there is provided an ink set comprising a yellow ink composition, a magenta ink composition, and a cyan ink composition, the cyan ink composition being the cyan ink composition according to the present invention, the magenta ink composition being the magenta ink composition according to the present invention.

In the ink compositions according to the present invention, in addition to a colorant commonly added to ink compositions (that is, a cyan colorant or a magenta colorant), a yellow colorant having a higher fading rate than the cyan colorant or magenta colorant is added as the colorant in the ink compositions. It should be noted that the cyan colorant or the magenta colorant contained as the colorant component in the ink composition, when exposed to outdoor or other environment after image formation, gradually undergoes a change in hue and becomes yellowish. On the other hand, the yellow colorant used in the ink compositions according to the present invention, when exposed to outdoor or other environment after image formation, is faded to render the yellowness of the colorant component low as a whole. Therefore, for example, when an image is formed using a cyan ink composition containing a cyan colorant and a yellow colorant followed by exposure of the image to outdoor or other environment, the cyan colorant contained in the ink composition yellows with the elapse of time while the yellowness of the yellow colorant is lowered. Consequently, it is considered that the recorded image can hold the original hue of the cyan ink composition and can form images possessing excellent lightfastness. The same is applied with respect to the magenta ink composition. The use of a cyan ink composition and a magenta ink composition, which have adopted the above constitution, in an ink set can produce images having better lightfastness. Further, when the yellow colorant to be used in ink compositions respectively containing a cyan colorant and a magenta colorant is properly selected while taking into consideration the difference in fading rate between the cyan colorant and the magenta colorant, the lightfastness of images can be further improved.

DETAILED DESCRIPTION OF THE INVENTION

Ink Compositions

The ink compositions according to the present invention may be used in recording methods using ink compositions. Recording methods using ink compositions include, for example, an ink jet recording method, a recording method using writing utensils, such as pens, and other various printing methods. Preferably, the ink compositions according to the present invention are used in an ink jet recording method.

Cyan Ink Composition

The cyan ink composition according to the present invention basically comprises, as colorants, a cyan colorant and a yellow colorant having a higher fading rate than the cyan colorant. Here the cyan colorant is selected from the group consisting of C.I. Pigment Blue 15:3, C.I. Pigment Blue 15:4, and a mixture of the cyan colorants.

In the present invention, the "fading rate" refers to a rate at which, when a record with ink coated thereon is exposed to light emitted from a fluorescent lamp or direct sunlight, for example, in the open for a long period of time, the OD value (optical density) of the ink is lowered as compared with that before the exposure. In general, the fading rate can be defined by the following equation through the application of a predetermined acceleration test.

$$\text{Fading rate} = 100 \times \{(\text{OD value before acceleration test}) - (\text{OD value after acceleration test})\} / \text{OD value before acceleration test}$$

"Yellow colorant having a higher fading rate" refers to a yellow colorant which is more likely to fade than the cyan colorant according to the present invention.

Specifically, "that the fading rate of the yellow colorant is higher than the fading rate of the cyan colorant" means that, preferably, the fading rate value of the yellow colorant in a predetermined acceleration test for a predetermined period of time (for example, 200 hr) is three times or higher than the fading rate value of the cyan colorant, more preferably the fading rate value of the yellow colorant is 5 times or higher than the fading rate value of the cyan colorant.

Alternatively, "that the fading rate of the yellow colorant is higher than the fading rate of the cyan colorant" means that, when a print with a colorant coated thereon is placed under such environmental conditions as to cause fading, preferably under predetermined acceleration test conditions, the fading time, of the yellow colorant, defined as the time necessary for the OD value of the print to be lowered by a given rate is preferably not more than one-third, more preferably not more than one-fifth, of the fading time of the cyan colorant.

In the present invention, the "predetermined acceleration test" refers to an acceleration test for evaluating a deterioration in quality of an image placed under given conditions for a predetermined period of time, which conditions have been determined by taking into consideration service conditions, under which the utilization of the print is contemplated, and a period of time for which the print is placed under the above service conditions. For example, when the print is placed outdoors and is exposed to direct sunlight, the predetermined acceleration test refers to a test in which a deterioration in the quality of an image, when placed outdoors for a predetermined period of time, is reproduced in a shortened period of time, while, when the print is placed indoors, the predetermined acceleration test refers to a test in which a deterioration in quality of an image, when placed indoors for a predetermined period of time, is reproduced in a shortened period of time. In general, in the former, light having higher intensity than the latter is applied, and, when the desired period of time for which the print is placed is longer, light having higher intensity is exposed for a longer period of time. Further, in the case of an acceleration test for reproducing a deterioration in the quality of an image, when placed under special service conditions, such as under high-humidity environment, for a desired period of time, the acceleration test refers to an acceleration test in which such special conditions have been taken into consideration. A specific example of the acceleration test is an acceleration test performed, for example, under the following conditions, as a test for reproducing, in a shortened period of time, a deterioration in quality of an image under service conditions such that the image is allowed to stand for several years in a room having a window on the south side. That is, accelelation tester: xenon weather-o-meter Ci35A, manufactured by ATLAS; light source: xenon lamp; optical filter: borosilicate glass; irradiation energy: 0.35 $W/m^2$ (340 nm); black panel temperature: 63° C.; internal temperature of tester: 24° C.; and internal humidity of tester: 60%. These conditions may be properly varied depending upon expected service conditions. For example, an acceleration test may be carried out using a fluorescent lamp of 1,000 to 100,000 luxes according to the expected service conditions.

Here "yellow OD value" is an OD value as measured for yellow which has been printed by blotted image printing (100% duty blotted image printing) on the so-called "plain paper," for example, with a Macbeth PCM-II tester manufactured by Macbeth.

The yellow colorant used in the cyan ink composition according to the present invention may be any yellow colorant so far as the yellow colorant has a higher fading rate than the cyan colorant. Therefore, any of dyes and pigments may be used as the yellow colorant. However, the use of dyes is preferred.

Various dyes, for example, direct dyes, acid dyes, foodstuff dyes, basic dyes, reactive dyes, disperse dyes, vat dyes, soluble vat dyes, and reactive disperse dyes, may be used as the dye.

Any of inorganic and organic pigments may be used as the pigment. Inorganic pigments include, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline black.

According to a preferred embodiment of the present invention, the pigment is added, to the ink composition, as a pigment dispersion prepared by dispersing the pigment in an aqueous medium with the aid of a dispersant or a surfactant. Preferred dispersants include dispersants commonly used in the preparation of pigment dispersions, for example, polymeric dispersants. It would be apparent to a person having ordinary skill in the art that the dispersant and the surfactant contained in the pigment dispersion would function also as a dispersant and a surfactant for the ink composition.

Specific examples of yellow colorants, which are preferred in the present invention, include: dyes, such as. C.I. Acid Yellow 23, C.I. Direct Yellow 86, and C.I. Direct Yellow 132; and pigments, such as C.I. Pigment Yellow 13, C.I. Pigment Yellow 17, C.I. Pigment Yellow 74, C.I. Pigment Yellow 83, and C.I. Pigment Yellow 93. The yellow colorant is more preferably C.I. Acid Yellow 23, C.I. Direct Yellow 86, or C.I. Direct Yellow 132. In the present invention, these yellow colorants may be used solely or in combination of two or more.

The amount of the cyan colorant in the cyan ink composition added in the present invention is preferably about 0.1 to 15% by weight, more preferably about 0.3 to 4% by weight.

Further, the amount of the yellow colorant used in the cyan ink composition according to the present invention may be properly selected so far as desired lightfastness can be held. Preferably, however, the amount of the yellow colorant added is 0.005 to 0.05% by weight, more preferably 0.005 to 0.02% by weight, based on the cyan colorant (1% by weight).

Magenta Ink Composition

The magenta ink composition according to the present invention basically contains, as colorants, a magenta colorant and a yellow colorant having a higher fading rate than the magenta colorant. Here the magenta colorant is selected from the group consisting of C.I. Pigment Red 122, C.I. Pigment Red 202, C.I. Pigment Red 209, and mixtures of the magenta colorants.

In the present invention, the "fading rate" and the "predetermined acceleration test" are as described above.

Further, the "yellow colorant having a higher fading rate" used herein refers to a colorant which is more likely to fade than the magenta colorant.

Specifically, "that the fading rate of the yellow colorant is higher than the fading rate of the magenta colorant" means that, preferably, the fading rate value of the yellow colorant in a predetermined acceleration test for a predetermined period of time (for example, 200 hr) is three times or higher than the fading rate value of the magenta colorant, more preferably, the fading rate value of the yellow colorant is 5 times or higher than the fading rate value of the magenta colorant.

Alternatively, "that the fading rate of the yellow colorant is higher than the fading rate of the magenta colorant" means that, when a print with a colorant coated thereon is placed under such environmental conditions as to cause fading, preferably under predetermined acceleration test conditions, the fading time, of the yellow colorant, defined as the time necessary for the OD value of the print to be lowered by a given rate is preferably not more than one-third, more preferably not more than one-fifth, of the fading time of the magenta colorant.

The yellow colorant used in the magenta ink composition according to the present invention may be selected from those described above in connection with the yellow colorant used in the cyan ink composition.

The amount of the magenta colorant in the magenta ink composition added in the present invention is preferably about 0.1 to 15% by weight, more preferably about 0.5 to 5% by weight.

Further, the amount of the yellow colorant used in the magenta ink composition according to the present invention may be properly selected so far as desired lightfastness can be held. Preferably, however, the amount of the yellow colorant added is 0.005 to 0.05% by weight, more preferably 0.007 to 0.03% by weight, based on the magenta colorant (1% by weight).

In general, magenta ink is more likely to undergo a change in hue than cyan ink. Therefore, when the cyan ink composition and the magenta ink composition are used in combination in an ink set, preferably, the yellow colorant used in the magenta ink composition has a higher fading rate than, that is, is more likely to fade than, the yellow colorant used in the cyan ink composition.

Other Ink Compositions

According to another aspect of the present invention, there is provided an ink set comprising a yellow ink composition, a magenta ink composition, and a cyan ink composition. In this case, the cyan ink composition is the cyan ink composition according to the present invention, or alternatively, the magenta ink composition is the magenta ink composition according to the present invention. Further, both the cyan ink composition and the magenta ink composition in the ink set may be respectively the cyan ink composition according to the present invention and the magenta ink composition according to the present invention.

The yellow colorant contained in the yellow ink composition used in the ink set according to the present invention may be any yellow colorant so far as yellow can be printed. In the present invention, a yellow pigment is preferred.

Further, in the present invention, the ink set comprising the yellow ink composition, the magenta ink composition, and the cyan ink composition may further comprise a black ink composition. The colorant contained in the black ink composition usable in the present invention may be any colorant so far as black can be printed. In the present invention, the use of a black pigment is preferred.

In the present invention, pigments usable in the yellow ink composition and the black ink composition include inorganic pigments and organic pigments. Inorganic pigments include, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline black.

According to a preferred embodiment of the present invention, the pigment is added, to the ink composition, as a pigment dispersion prepared by dispersing the pigment in an aqueous medium with the aid of a dispersant or a surfactant. Preferred dispersants include dispersants commonly used in the preparation of pigment dispersions, for example, polymeric dispersants. It would be apparent to a person having ordinary skill in the art that the dispersant and the surfactant contained in the pigment dispersion would function also as a dispersant and a surfactant for the ink composition.

According to the present invention, the colorant used in the yellow ink composition or the black ink composition may be a single type colorant or a mixture of a plurality of types of colorants.

In the ink set according to the present invention, the content of the colorant in the yellow ink composition is not particularly limited. The colorant content, however, is preferably 2 to 15% by weight, more preferably 3 to 5% by weight, based on the yellow ink composition.

Further, in the present invention, the content of the colorant in the black ink composition is not particularly limited. The content of the colorant in the black ink composition, however, is preferably 2 to 15% by weight, more preferably 2 to 8% by weight.

Water, Water-soluble Organic Solvent, and Other Optional Ingredients

According to a preferred embodiment of the present invention, when the colorant used in these ink compositions is a pigment, this pigment is preferably added, to the ink composition, as a pigment dispersion prepared by dispersing the pigment in an aqueous medium with the aid of a dispersant or a surfactant. Preferred dispersants include dispersants commonly used in the preparation of pigment dispersions, for example, polymeric dispersants.

Examples of preferred dispersants include cationic dispersants, anionic dispersants, and nonionic dispersants. Examples of anionic dispersants include polyacrylic acid, polymethacrylic acid, acrylic acid/acrylonitrile copolymer, vinyl acetate/acrylic ester copolymer, acrylic acid/acrylic alkyl ester copolymer, styrene/acrylic acid copolymer, styrene/methacrylic acid copolymer, styrene/acrylic acid/acrylic alkyl ester copolymer, styrene/methacrylic acid/acrylic alkyl ester copolymer, styrene/α-methylstyrene/acrylic acid copolymer, styrene/α-methylstyrene/acrylic acid/acrylic alkyl ester copolymer, styrene/maleic acid copolymer, vinylnaphthalene/maleic acid copolymer, vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer. Examples of anionic surfactants include sodium dodecylbenzenesulfonate, sodium laurylate, and ammonium salt of polyoxyethylene alkyl ether sulfates. Examples of nonionic surfactants include polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides. They may be used alone or in a combination of two or more. According to a preferred embodiment of the present invention, a water-soluble styrene-(meth)acrylic acid resin is utilized as a dispersant. In the ink compositions according to the present invention, water or a mixed solution composed of water and a water-soluble organic solvent is suitable as a main solvent. Water may be pure water obtained by ion exchange, ultrafiltration, reverse osmosis, distillation or the like, or ultrapure water. Further, water, which has been sterilized, for example, by ultraviolet irradiation or by addition of hydrogen peroxide, is preferred because, when the ink composition is stored for a long period of time, it can prevent the growth of mold and bacteria.

Examples of water-soluble organic solvents include highboiling organic solvents. High-boiling organic solvents function to prevent the ink composition from drying and consequently to prevent head clogging. Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone and N-methyl-2-pyrrolidone; 1,3-dimethyl-2-imidazolidinone; and triethanolamine. The amount of the high-boiling organic solvent added is not particularly limited. The amount of the high-boiling organic solvent added, however, is preferably about 0.5 to 40% by weight, more preferably about 2 to 20% by weight.

Further, the ink compositions may contain a low-boiling organic solvent as the water-soluble organic solvent. Examples of preferred low-boiling organic solvents usable herein include methanol, ethanol, n-propyl alcohol, isopropyl alcohol, n-butanol, sec-butanol, tert-butanol, isobutanol, and n-pentanol. Particularly preferred are monohydric alcohols. The low-boiling organic solvent has the effect of shortening the drying time of ink.

According to a preferred embodiment of the present invention, the ink compositions may contain a penetrating agent. Penetrating agents usable herein include various surfactants, such as anionic, cationic, and amphoteric surfactants; alcohols, such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether. In particular, the utilization of diethylene glycol monobutyl ether or triethylene glycol monobutyl ether is preferred. Although the amount of the penetrating agent added may be properly determined, the amount of the penetrating agent is preferably about 1 to 20% by weight, more preferably about 1 to 10% by weight.

Further, acetylene glycols represented by formula (a) may be mentioned as examples of the penetrating agent.

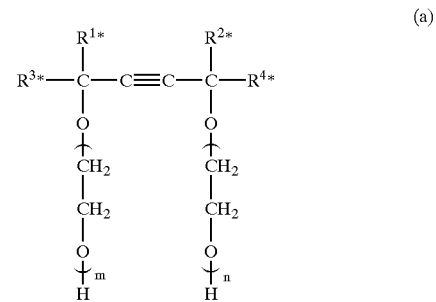

(a)

wherein $0 \leq m+n \leq 50$; and $R^{1*}$, $R^{2*}$, $R^{3*}$, and $R^{4*}$ each independently represent an alkyl group, preferably an alkyl group having 1 to 6 carbon atoms.

Commercially available acetylene glycols may be used as the acetylene glycols represented by the above formula. Specific examples thereof include OLFINE Y, Surfynol 82, Surfynol 440, Surfynol 465, and Surfynol 485 (all the above products being manufactured by Air Products and Chemicals Inc.). In particular, the utilization of Surfynol 465 is preferred. They may be used alone or in combination of two or more. The amount of the penetrating agent added is preferably 0.1 to 5% by weight, more preferably 0.3 to 3% by weight.

According to the present invention, the ink composition may further contain a saccharide. Specific examples of preferred saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbit.

The ink compositions according to the present invention may further contain nozzle clogging preventives, preservatives, antioxidants, electric conductivity adjustors, pH adjustors, solubilizers, viscosity modifiers, penetrating accelerators, surface tension modifiers and the like.

Examples of preservatives or antimolds include sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI).

Examples of pH adjustors, solubilizers, or antioxidants include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxides, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof.

The ink compositions according to the present invention may further contain an antioxidant and an ultraviolet absorber, and examples thereof include: Tinuvin 328, Tinuvin 900, Tinuvin 1130, Tinuvin 384, Tinuvin 292, Tinuvin 123, Tinuvin 144, Tinuvin 622, Tinuvin 770, Tinuvin 292, Irgacor 252, Irgacor 153, Irganox 1010, Irganox 1076, Irganox 1035, and Irganox MD 1024, manufactured by Ciba-Geigy; and lanthanide oxides.

Surface tension modifiers include: alcohols, such as diethanolamine, triethanolamine, glycerin, and diethylene glycol; and nonionic, cationic, anionic, or amphoteric surfactants.

Further, in the present invention, a single optional ingredient may be used as the optional ingredient. Alternatively, a plurality of optional ingredients may be selected from an identical group of optional ingredients or a plurality of groups of optional ingredients and used as a mixture.

In the present invention, the amounts of all the ingredients constituting the ink composition are preferably selected so that the viscosity of the ink composition is less than 10 mPa.s at 20° C.

Recording Method

The ink compositions according to the present invention are used in recording methods wherein ink compositions are deposited on recording media to perform printing.

According to a further aspect of the present invention, there is provided an ink jet recording method comprising the steps of: ejecting droplets of the ink composition according to the present invention; and depositing the droplets onto a recording medium to perform printing.

Further, according to the present invention, there is also provided a record produced by any one of these recording methods.

EXAMPLES

The present invention will be described in more detail with reference to the following examples, though it is not limited by these examples only. In the following examples, "%" is by weight unless otherwise specified.

Examination of Fading Rate of Colorants

For colorants listed in Table 1, ink compositions were prepared according to the following formulations. For each of the ink compositions thus obtained, a color patch was printed by means of an ink jet printer PM-770C manufactured by Seiko Epson Corp. in such a manner that the amount of ink deposited was regulated so as for the OD value of each color to be 1.0.

| Ink composition | |
|---|---|
| Colorant | 2 wt % |
| Styrene-acrylic acid copolymer (dispersant; only when colorant was pigment) | 1 wt % |
| Surfynol 465 | 1 wt % |
| Glycerin (viscosity modifier) | q.s. |
| Pure water | Balance |

The viscosity of each of the ink compositions was modified to 4 mPa.s (20° C.).

The color patches produced for the respective ink compositions were exposed to light by an acceleration tester under the following conditions to measure the time (light exposure time) necessary for the OD value of the color patch to be lowered to 0.9 (fading rate 10%).

Acceleration tester: Xenon weather-o-meter Ci35A, manufactured by ATLAS

Optical filter: Borosilicate glass

Irradiation energy: 0.35 W/m$^2$

Black panel temp.: 63° C.

Internal temp. of tester: 24° C.

Internal humidity of tester: 60%

The results were as summarized in Table 1.

TABLE 1

| Colorant | Light exposure time, hr |
|---|---|
| C.I. Pigment Blue 15:3 | 1,000 |
| C.I. Pigment Blue 15:4 | 950 |
| C.I. Pigment Red 122 | 1,100 |
| C.I. Pigment Red 202 | 800 |
| C.I. Pigment Red 209 | 900 |
| C.I. Pigment Yellow 128 | 850 |
| C.I. Pigment Yellow 13 | 100 |
| C.I. Pigment Yellow 17 | 120 |
| C.I. Pigment Yellow 74 | 300 |
| C.I. Direct Yellow 86 | 50 |
| C.I. Direct Yellow 132 | 80 |
| C.I. Acid Yellow 23 | 10 |

Preparation of Ink Compositions

The following ink compositions were prepared by a conventional method. Specifically, the colorants, together with the dispersant, were dispersed. Other ingredients were then added to and mixed with the dispersion. Insolubles having a size larger than a given size was removed from the mixture by filtration. Thus, ink compositions were prepared. The ink compositions thus obtained were combined to prepare ink sets.

Example 1

Ink set 1

| Cyan ink composition | |
|---|---|
| C.I. Pigment Blue 15:3 | 2 wt % |
| C.I. Pigment Yellow 74 | 0.01 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |
| The viscosity of the ink composition was modified to 5 mPa.s (20° C.). | |
| Magenta ink composition | |
| C.I. Pigment Red 122 | 3 wt % |
| C.I. Direct Yellow 86 | 0.03 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |
| The viscosity of the ink composition was modified to 5 mPa.s (20° C.). | |

-continued

Yellow ink composition

| | |
|---|---|
| C.I. Pigment Yellow 128 | 4 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mpa.s (20° C.).

Black ink composition

| | |
|---|---|
| Carbon black | 3 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mpa.s (20° C.).

Example 2

Ink Set 2

Cyan ink composition

| | |
|---|---|
| C.I. Pigment Blue 15:3 | 2 wt % |
| C.I. Pigment Yellow 74 | 0.01 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to mPa.s (20° C.).

Magenta ink composition

| | |
|---|---|
| C.I. Pigment Red 122 | 3 wt % |
| C.I. Pigment Yellow 13 | 0.03 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to mPa.s (20° C.).

Yellow ink composition

| | |
|---|---|
| C.I. Pigment Yellow 128 | 4 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mPa.s (20° C.).

Black ink composition

| | |
|---|---|
| Carbon black | 3 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mpa.s (20° C.).

Example 3

Ink Set 3

Cyan ink composition

| | |
|---|---|
| C.I. Pigment Blue 15:3 | 2 wt % |
| C.I. Pigment Yellow 13 | 0.01 wt % |
| C.I. Pigment Yellow 17 | 0.01 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to mPa.s (20° C.).

Magenta ink composition

| | |
|---|---|
| C.I. Pigment Red 122 | 3 wt % |
| C.I. Acid Yellow 23 | 0.2 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to mPa.s (20° C.).

Light cyan ink composition

| | |
|---|---|
| C.I. Pigment Blue 15:3 | 0.5 wt % |
| C.I. Pigment Yellow 17 | 0.0075 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to mPa.s (20° C.).

Light magenta ink composition

| | |
|---|---|
| C.I. Pigment Red 122 | 0.5 wt % |
| C.I. Direct Yellow 132 | 0.025 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to mPa.s (20° C.).

Yellow ink composition

| | |
|---|---|
| C.I. Pigment Yellow 128 | 4 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to mPa.s (20° C.).

-continued

Black ink composition

| | |
|---|---|
| Carbon black | 3 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mPa.s (20° C.).

Example 4

Ink Set 4

Cyan ink composition

| | |
|---|---|
| C.I. Pigment Blue 15:3 | 2 wt % |
| C.I. Pigment Yellow 13 | 0.01 wt % |
| C.I. Pigment Yellow 17 | 0.01 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to mPa.s (20° C.).

Magenta ink composition

| | |
|---|---|
| C.I. Pigment Red 122 | 3 wt % |
| C.I. Acid Yellow 23 | 0.2 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to mPa.s (20° C.).

Light cyan ink composition

| | |
|---|---|
| C.I. Pigment Blue 15:4 | 0.5 wt % |
| C.I. Pigment Yellow 17 | 0.0075 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mPa.s (20° C.).

Light magenta ink composition

| | |
|---|---|
| C.I. Pigment Red 122 | 0.4 wt % |
| C.I. Pigment Red 202 | 0.2 wt % |
| C.I. Direct Yellow 132 | 0.025 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mPa.s (20° C.).

Yellow ink composition

| | |
|---|---|
| C.I. Pigment Yellow 128 | 4 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mPa.s (20° C.).

Black ink composition

| | |
|---|---|
| Carbon black | 3 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mPa.s (20° C.).

Example 5 (Comparative)

Ink Set 5

Cyan ink composition

| | |
|---|---|
| C.I. Pigment Blue 15:3 | 2 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mPa.s (20° C.).

Magenta ink composition

| | |
|---|---|
| C.I. Pigment Red 122 | 3 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mPa.s (20° C.).

Light cyan ink composition

| | |
|---|---|
| C.I. Pigment Blue 153 | 0.5 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |

The viscosity of the ink composition was modified to 5 mPa.s (20° C.).

Light magenta ink composition

| | |
|---|---|
| C.I. Pigment Red 122 | 0.5 wt % |
| Styrene-acrylic acid copolymer (dispersant) | ½ (ratio to colorant) |
| Glycerin | 15 wt % |
| Triethylene glycol monobutyl ether | 5 wt % |

-continued

| | |
|---|---|
| Surfynol 465 | 1 wt % |
| Diethylene glycol (viscosity modifier) | q.s. |
| Pure water | Balance |
| The viscosity of the ink composition was modified to 5 mPa.s (20° C.). | |

Yellow ink composition

| | |
|---|---|
| C.I. Pigment Yellow 128 | 4 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |
| The viscosity of the ink composition was modified to 5 mPa.s (20° C.). | |

Black ink composition

| | |
|---|---|
| Carbon black | 3 wt % |
| Styrene-acrylic acid copolymer (dispersant) | ½ (ratio to colorant) |
| Glycerin | 15 wt % |
| Triethylene glycol monobutyl ether | 5 wt % |
| Surfynol 465 | 1 wt % |
| Diethylene glycol (viscosity modifier) | q.s. |
| Pure water | Balance |
| The viscosity of the ink composition was modified to 5 mPa.s (20° C.). | |

Evaluation Test
Evaluation Test on Lightfastness of Ink Compositions

The ink sets 1 and 2 were used with an ink jet printer PM-900C manufactured by Seiko Epson Corp., and the ink sets 3 and 4 were used with an ink jet printer PM-770C manufactured by Seiko Epson Corp. to perform printing under the following conditions.

Printing paper: gloss film manufactured by Seiko Epson Corp.
Printing mode: resolution 720 dpi×720 dpi
Printing pattern: blotted image (100% duty) (printing was carried out for each ink composition included in the ink set)
Blotted image prints were exposed under the following conditions.
Optical filter: Borosilicate glass
Irradiation energy: 0.35 w/m² (340 nm)
Black panel temp.: 63° C.
Internal temp. of tester: 24° C.
Internal humidity of tester: 60%
Light exposure: 100 kJ/m² (79 hr)

For the prints before and after the exposure, the $L^*a^*b^*$ color system of the color difference indication method specified in CIE (Commission International de l'Eclairage) was measured with Macbeth CE-7000 spectrophotometer manufactured by Machbeth, and a change in hue ΔE was calculated by equation $$\Delta E=(\Delta L^{*2}+\Delta a^{*2}+\Delta b^{*2})^{1/2}$$

ΔE values can be evaluated as follows.
ΔE≦3: good
3<ΔE≦5: practically acceptable
5<ΔE: practically not acceptable
The results were as summarized in Table 2.

Evaluation Test on Lightfastness of Printed Images

Printing was carried out in the same manner as described above in connection with the evaluation test on lightfastness of the ink composition, except that the following print pattern was printed.

Printing pattern: portrait image (color image)

Images thus obtained were allowed to stand indoors at a place exposed to direct sunlight for one month. The images before and after the standing were visually inspected by 50 evaluators to determine the number of evaluators who could perceive a change in hue of image between before and after the standing. The lightfastness of images produced by the ink sets according to the present invention were evaluated according to the following criteria.

A: Less than 25 evaluators could perceive a change in hue of image.

B: Not less than 25 evaluators could perceive a change in hue of image.

The results were as summarized in Table 2.

TABLE 2

| | Ink set 1 | Ink set 2 | Ink set 3 | Ink set 4 | Ink set 5 |
|---|---|---|---|---|---|
| ΔE | | | | | |
| Cyan ink | 1.0 | 0.8 | 1.2 | 1.2 | 5.3 |
| Magenta ink | 1.8 | 1.7 | 2.0 | 2.0 | 7.2 |
| Light cyan ink | — | — | 0.5 | 0.3 | 3.1 |
| Light magenta ink | — | — | 0.7 | 0.4 | 4.6 |
| Evaluation of lightfastness of color image | A | A | A | A | B |

What is claimed is:

1. A cyan ink composition comprising, as colorants, a cyan colorant selected from the group consisting of C.I. Pigment Blue 15:3, C.I. Pigment Blue 15:4, and a mixture of said cyan colorants, and a yellow colorant having a higher fading rate than the cyan colorant.

2. The cyan ink composition according to claim 1, wherein the content of the yellow colorant is 0.005 to 0.05% by weight based on the cyan colorant.

3. A magenta ink composition comprising, as colorants, a magenta colorant selected from the group consisting of C.I. Pigment Red 122, C.I. Pigment Red 202, C.I. Pigment Red 209, and mixtures of said magenta colorants, and a yellow colorant having a higher fading rate than the magenta colorant.

4. The magenta ink composition according to claim 3, wherein the content of the yellow colorant is 0.005 to 0.05% by weight based on the magenta colorant.

5. The ink composition according to claim 1, wherein the yellow colorant is a dye.

6. The ink composition according to claim 5, wherein the dye is selected from the group consisting of C.I. Acid Yellow 23, C.I. Direct Yellow 86, C.I. Direct Yellow 132, and mixtures of said dyes.

7. The ink composition according to claim 1, which is used in an ink jet recording method.

8. An ink set comprising a yellow ink composition, a magenta ink composition, and a cyan ink composition,
said cyan ink composition being the ink composition according to claim 1.

9. An ink set comprising a yellow ink composition,
said magenta ink composition being the ink composition according to claim 3.

10. An ink set comprising a yellow ink composition, a magenta ink composition, and a cyan ink composition,
said cyan ink composition being the ink composition according to claim 1,
said magenta ink composition being the ink composition according to claim 3.

11. The ink set according to claim 8, which further comprises a black ink composition.

12. The ink set according to claim 8, which is used in an ink jet recording method.

13. A recording method comprising the step of depositing an ink composition onto a recording medium to perform printing, said ink composition being one according to claim 1.

14. An ink jet recording method comprising the steps of: ejecting droplets of an ink composition; and depositing the droplets onto a recording medium to perform printing, said ink composition being one according to claim 1.

15. A record produced by the method according to claim 13.

16. The ink composition according to claim 2, wherein the yellow colorant is a dye.

17. The ink composition according to claim 3, wherein the yellow colorant is a dye.

18. The ink composition according to claim 4, wherein the yellow colorant is a dye.

19. The ink composition according to claim 2, which is used in an ink jet recording method.

20. The ink composition according to claim 3, which is used in an ink jet recording method.

* * * * *

UNITED STATES PATENT AND TRADEMARK OFFICE
CERTIFICATE OF CORRECTION

PATENT NO.   : 6,716,279 B2
DATED        : April 6, 2004
INVENTOR(S)  : Kiyohiko Takemoto It is certified that error appears in the above-identified patent and that said Letters Patent is hereby corrected as shown below:

Title page,
Item [*] Notice, "250" should read -- 253 --.

Signed and Sealed this

Twenty-fifth Day of May, 2004

JON W. DUDAS
*Acting Director of the United States Patent and Trademark Office*